(12) United States Patent
Kjellmann

(10) Patent No.: US 12,233,968 B2
(45) Date of Patent: Feb. 25, 2025

(54) TRACK KIT

(71) Applicant: MK Evol AS, Alta (NO)

(72) Inventor: Morten Kjellmann, Alta (NO)

(73) Assignee: MK Evol AS, Alta (NO)

( * ) Notice: Subject to any disclaimer, the term of this patent is extended or adjusted under 35 U.S.C. 154(b) by 333 days.

(21) Appl. No.: 17/831,452

(22) Filed: Jun. 3, 2022

(65) Prior Publication Data

US 2022/0297775 A1   Sep. 22, 2022

Related U.S. Application Data

(63) Continuation of application No. 16/574,120, filed on Sep. 18, 2019, now Pat. No. 11,383,774.

(30) Foreign Application Priority Data

Oct. 23, 2018  (NO) .................................... 20181357
Oct. 25, 2018  (NO) .................................... 20181380

(51) Int. Cl.

| | |
|---|---|
| *B62D 55/084* | (2006.01) |
| *B60G 17/005* | (2006.01) |
| *B62D 55/10* | (2006.01) |
| *B62D 55/104* | (2006.01) |
| *B62D 55/14* | (2006.01) |
| *B62D 55/24* | (2006.01) |
| *B62D 55/26* | (2006.01) |
| *B62M 27/02* | (2006.01) |

(52) U.S. Cl.
CPC ......... *B62D 55/084* (2013.01); *B60G 17/005* (2013.01); *B62D 55/10* (2013.01); *B62D 55/104* (2013.01); *B62D 55/14* (2013.01); *B62D 55/244* (2013.01); *B62D 55/26* (2013.01); *B62M 27/02* (2013.01); *B62M 2027/025* (2013.01); *B62M 2027/027* (2013.01)

(58) Field of Classification Search
CPC .... B62D 55/084; B62D 55/10; B62D 55/104; B62D 55/14; B62D 55/244; B62D 55/26; B60G 17/005
See application file for complete search history.

(56) References Cited

U.S. PATENT DOCUMENTS

| | | | | |
|---|---|---|---|---|
| 3,901,335 | A  * | 8/1975 | Johnson ................. | B60K 11/02 180/190 |
| 9,505,454 | B1 * | 11/2016 | Kautsch ............... | B62D 55/112 |
| 11,383,774 | B2 * | 7/2022 | Kjellmann ........... | B62D 55/108 |
| 2005/0062239 | A1 * | 3/2005 | Shore ................... | B60G 17/056 280/124.159 |
| 2015/0048671 | A1 * | 2/2015 | Hansen .................. | B62D 55/24 305/165 |
| 2016/0194038 | A1 * | 7/2016 | Jean ...................... | B62D 55/244 305/15 |
| 2017/0210434 | A1 * | 7/2017 | Brazier ................ | B62D 55/104 |

* cited by examiner

*Primary Examiner* — Kevin Hurley
*Assistant Examiner* — Abigail R Hymel
(74) *Attorney, Agent, or Firm* — Christian D. Abel

(57) ABSTRACT

A track kit for a vehicle, having two track assemblies, each track assembly having an endless track, a front idler wheel, an intermediate support member with at least one track engaging element, a rear idler wheel, a drive wheel, at least one swing arm and a shock absorber connecting assembly. The endless track has an external side featuring ground lugs for ground engagement and an internal side featuring drive lugs for engagement with the drive wheel, and the internal side is circumferentially trained around and in contact with the front idler wheel.

13 Claims, 12 Drawing Sheets

TRACK KIT

CROSS REFERENCE TO RELATED APPLICATIONS

This is a continuing application under 35 U.S.C. § 120 of U.S. application Ser. No. 16/574,120 filed 18 Sep. 2019.

FIELD OF THE INVENTION

The present invention concerns the technical field of track kits for conversion of a wheel-drive vehicle to a track-drive vehicle.

BACKGROUND

Track assemblies or track kits for the conversion of a wheel-drive vehicle, such as all-terrain vehicles (ATV's) and utility terrain vehicles (UTV's) to track-drive vehicles are well known.

The prior art track assemblies are mounted on the wheel hub unit of the vehicles such that the original wheels are replaced by the track assemblies. This allows for an improved traction and navigability of the vehicle in rugged terrain and in snowy conditions. However, the prior art track assemblies have a much higher mass than the wheels they replace, and the un-sprung mass is thus increased. The increased unsprung mass limits the usable speed of the vehicle. In addition to limiting the usable speed, the prior art track assemblies are also known to induce an increased wear of the original suspension components, such as bushings and ball joints. Further, the durability of the prior art track assemblies themselves is low, due to high internal unsprung mass.

US 2017/0210434 A1 discloses a track assembly for mounting to the wheel hub unit of a wheel-drive vehicle. The track assembly is stabilized by a dual-pivot arm arranged at a front section of the track assembly. The dual-pivot arm is mountable to a frame member of the vehicle to prevent contact between the vehicle and the track assembly.

CA 2735095 A1 discloses a track assembly for mounting to the wheel hub unit of a wheel-drive vehicle. When the wheel-drive vehicle comprises a shock absorber, the shock absorber is replaced by a rigid member to lock movement of the original vehicle suspension, and suspension of the track is obtained by a spring and dampener being part of the track assembly. In this manner, the un-sprung weight of the converted vehicle is reduced.

Various prior art track assemblies are also disclosed in for instance WO 2017/222622 A1 and US 2014/0231157 A1.

The aim of the present invention is to provide an improved track assembly for conversion of a wheel-drive vehicle to a track-drive vehicle. The track assembly alleviates or avoids at least some of the disadvantages of the prior art track assemblies. In particular, the invention provides a track assembly having reduced unsprung mass and an increased ground contacting track area.

SUMMARY OF THE INVENTION

The present invention is defined by the attached claims and in the following:

In a first aspect, the present invention provides a track kit for a vehicle, the vehicle comprising a chassis, a rear drive axle featuring two opposite wheel hub units, and a rear suspension, and the track kit comprises two track assemblies (or alternatively two rear track assemblies), each track assembly comprises an endless track, a front idler wheel, an intermediate support member comprising at least one track engaging element, a rear idler wheel, a drive wheel, at least one swing arm and a shock absorber connecting assembly, wherein the endless track comprises an external side featuring ground lugs for ground engagement and an internal side featuring drive lugs for engagement with the drive wheel, and the internal side is circumferentially trained around and in contact with the front idler wheel, the at least one track engaging element, the rear idler wheel and the drive wheel;

the drive wheel is connectable to one of the wheel hub units, preferably connectable to the wheel hub unit by the bolts used for mounting a wheel, i.e. for mounting the rims of a wheel;

the front idler wheel is arranged at a level above the at least one track engaging element and comprises a front idler wheel axle rigidly connectable to the chassis;

the at least one swing arm is pivotably connected to the intermediate support member and pivotably connectable to the chassis;

the shock absorber connecting assembly is connected to the intermediate support member and operably connectable to a lower connecting end of a shock absorber having an upper end operably connected to the chassis.

The first aspect may also be defined as a track kit for conversion of a wheel-drive vehicle.

The two track assemblies of the track kit are preferably mirror images of each other.

The intermediate support member may be any type of longitudinal framework or beam suitable for supporting any type of track engaging member, such as slide rails and/or idler wheels. The intermediate support member may be arranged such that the track engaging member is in contact with the track at a level below the front idler wheel.

The at least one swing arm, may also be termed a swing arm assembly. The at least one swing arm is arranged such that the intermediate support member may move relative to the front idler wheel, preferably in both a vertical and horizontal direction, and relative to the chassis during use. Further, the at least one swing arm may be arranged to guide the movement of the intermediate support member such that the tension of the endless track is maintained during vertical movement of the intermediate support member, i.e. vertical movement caused by ground interaction during use. In other words, the at least one swing arm may be arranged to guide the intermediate support member in a horizontal direction away from the front idler wheel when the intermediate support member is forced in a vertical direction towards the chassis during use. The at least one swing arm may further be arranged to prevent sideways and/or torsional movement of the intermediate support member.

In other words, the at least one swing arm may be arranged to prevent sideways and/or torsional movement of the intermediate support member relative the longitudinal direction of the track assembly and the chassis.

The at least one swing arm is preferably pivotably connected to the intermediate support member and pivotably connectable to the chassis, such that the intermediate support member is only allowed to move in a vertical plane, i.e. a vertical plane parallel to the direction of the suspension travel during use or a vertical plane parallel to the longitudinal direction of the track assembly. Alternatively, the intermediate support assembly may be defined as only being allowed to move in a vertical plane intersecting the whole endless track.

The various types of idler wheels, i.e. the front idler wheel, the rear idler wheel and intermediate idler wheel, as well as the pinch wheel (see below), may each comprise a set of parallel wheels having a common rotational axis.

The rear idler wheel is arranged to guide the endless track from the at least one track engaging element to the drive wheel and may be connected to a rear section of the intermediate support member.

The front idler wheel may be arranged at a level above and in front of the at least one track engaging element, such that the endless track extends between the front idler wheel and a foremost track engaging element at an angle of more than 0°, and preferably between 5-30°, relative the horizontal.

The front idler wheel is preferably connectable to the chassis at a level allowing space/room for at least a section of the endless track to run between the front idler wheel and the chassis.

In other words, the front idler wheel axle is connectable to the chassis, optionally via any suitable intermediate element or feature, such that the idler wheel axle is held at a fixed level relative the chassis. In other words, the front idler wheel may be rotatably connectable to the chassis, such that the front idler wheel is arranged at a fixed level relative to the chassis during use.

In other words, the shock absorber connecting assembly is connected to the intermediate support member and operably connectable to at least a lower connecting end of a shock absorber, such that the shock absorber will act on the intermediate support member during use. The upper end of the shock absorber may be at least indirectly connected to the chassis at a connecting point having a fixed level relative to the chassis. The connecting point may for instance be the vehicles original mount for the upper end of a shock absorber or the first connection of a rear suspension locking device, see below. In other embodiments, the connecting point for the upper end of a shock absorber may be arranged on a support framework, see below. The shock absorber may be an original shock absorber of the rear suspension of the vehicle, i.e. the vehicle may have a rear suspension comprising the shock absorber or at least one shock absorber. Alternatively, the shock absorber may be a shock absorber specific for use with the track kit.

In an embodiment of the track kit, each track assembly comprises a pinch wheel in contact with the external side of the endless track and arranged adjacent to the drive wheel and rear of the front idler wheel.

The pinch wheel may be arranged adjacent to the drive wheel and rear of the front idler wheel to improve the contact between the drive wheel and the drive lugs and to guide the endless track to a level below the chassis if required.

In an embodiment, the pinch wheel is arrangeable at a level below the chassis.

In an embodiment, the track kit is for a vehicle having a rear suspension comprising a shock absorber (i.e. an original shock absorber) for each of the wheel hub units and the shock absorber connecting assembly is connected to the intermediate support member and operably connectable to at least a lower connecting end of one of the shock absorbers. In other words, when mounted to a vehicle having a rear suspension comprising a shock absorber for each of the wheel hub units, the shock absorber connecting assembly is connected to the intermediate support member and operably connectable to at least a lower connecting end of one of the shock absorbers, such that the shock absorber will act on the intermediate support member during use. Alternatively, the original shock absorbers of the vehicle may be replaced by shock absorbers specific for the track kit.

In an embodiment, the track kit comprises at least one shock absorber being operably connectable between the shock absorber connecting assembly and the chassis of a vehicle.

In an embodiment of the track kit, the shock absorber connecting assembly comprises a shock connecting arm pivotably connected to the intermediate support member and pivotably connectable to the chassis, the shock connecting arm comprises a connection for (or is connectable to) a lower end of the shock absorber, and is preferably connected to the intermediate support member, and connectable to the chassis, via a multi-directional joint. The multi-directional joint may be any suitable joint such as a ball joint and similar. When the vehicle comprises a shock absorber for each of the wheel hub units, the shock absorber connecting assembly may be defined as comprising a shock connecting arm pivotably connected to the intermediate support member and pivotably connectable to the chassis, the shock connecting arm comprises a connection for (or is connectable to) a lower end of one of the shock absorbers, and is preferably connected to the intermediate support member, and connectable to the chassis, via a multi-directional joint.

In an embodiment of the track kit, the at least one track engaging element comprises at least one intermediate idler wheel, a slide rail or any combination thereof. The track engaging element may be multiple intermediate idler wheels rotatably connected to the intermediate support member.

In an embodiment, the track kit comprises a rear suspension locking device arrangeable to prevent vertical movement of the wheel hub units (to which the track assemblies are connected or connectable) relative the chassis during use. The rear suspension locking device may be arrangeable to lift the level of the wheel hub units relative the chassis.

In an embodiment of the track kit, the rear suspension locking device is a part of the shock absorber connecting assembly and comprises a first connection for an upper end of the shock absorber. In other words, the shock absorber connecting assembly comprises the rear suspension locking device.

In other words, the rear suspension locking device may be arrangeable or connectable to lock the wheel hub unit(s) in a position having a higher vertical level than the original position of the wheel hub unit(s). In other words, the rear suspension locking device may be arrangeable or connectable to lock the wheel hub unit(s) in a position closer to the chassis. By being able to raise the wheel hub unit(s) to a higher level the track kit may easily be arranged to accommodate a longer suspension/dampening travel of the intermediate support member without interfering with the drive wheel.

In an embodiment of the track kit, the rear suspension locking device comprises a first connection for an upper end of the shock absorber.

In an embodiment of the track kit, the rear suspension locking device comprises a second connection for a vertically moveable portion of the rear suspension and a third connection for connecting the rear suspension locking device to the chassis. The vertically moveable portion will depend on the type of rear suspension, i.e. the vertically moveable portion may for instance be an A-arm, a trailing arm, a vertically moveable link in a multi-link suspension etc. Common for all vertically moveable portions is that their vertical movement translates into a vertical movement of the wheel hub unit.

In an embodiment of the track kit, the third connection of the rear suspension locking device is arranged to be connected, or is connectable, to the chassis via a mount for the upper end of the shock absorber, i.e. via the original mount for the upper end of the shock absorber of the vehicle.

In an embodiment of the track kit, the rear suspension locking device comprises a longitudinal element, e.g. a beam, comprising at least the second connection and the third connection. The longitudinal element may preferably also comprise the first connection for an upper end of the shock absorber, the first connection preferably arranged between the second and third connection.

In an embodiment of the track kit, the pinch wheel comprises a pinch wheel axle being rigidly connectable to the chassis. In other words, the pinch wheel axle is connectable to the chassis, optionally via any suitable intermediate element or feature, such that the pinch wheel axle is fixed/rigid relative to the chassis. In other words, such that the pinch wheel axle and the pinch wheel are at a fixed level relative to the chassis In an embodiment of the track kit, the at least one swing arm comprises a front swing arm and a rear swing arm, the front swing arm is pivotably connected to a front section of the intermediate support member and pivotably connectable to the chassis, and the rear swing arm is pivotably connected to a rear section of the intermediate support member and pivotably connectable to the chassis, optionally via an element of the vehicle or track assembly having a fixed position relative the chassis. The rear swing arm may be pivotably connected to the intermediate support member via a pivot link arm pivotably connected to the rear section of the intermediate support member and a lower end of the rear swing arm.

In an embodiment, the track kit (or each track assembly) comprises a front shock absorber pivotably connected to a front section of the intermediate support member and operably connectable to the chassis. The front shock absorber may also be defined as being pivotably connectable to the chassis. In other words, the front shock absorber is operably connected or arranged between the front section of the intermediate support member and the chassis such that the front section is pushed/forced in a downwards direction. In other words, the front shock absorber is connected or arranged between the front section of the intermediate support member and the chassis, such that the balance point of the vehicle is moved towards the front. The effect of the front shock absorber is that less of the vehicles mass is supported by front steering elements of the vehicle, or in other words, more of the vehicles mass is supported by the track assemblies. In other words, the front shock absorber provides a reduced ground pressure at the front of the vehicle. The front steering elements may be a set of wheels, skis or tracks.

In other words, the front shock absorber is connected/connectable such that the intermediate support member has a suspension travel, or has a vertical travel that is dampened, relative the chassis during use.

In an embodiment of the track kit, each track assembly comprises a first connecting element to which the front idler wheel axle is rigidly connected and a second connecting element to which the at least one swing arm is pivotably connected.

In an embodiment of the track kit, each track assembly comprises a third connecting element and the rear swing arm is pivotably connected to the second connecting element and the front swing arm is pivotably connected to third connecting element.

In an embodiment of the track kit, each track assembly comprises at least one of a fourth connecting element to which the front shock absorber is pivotably connected, a fifth connecting element to which the pinch wheel axle is rigidly connected and a sixth connecting element to which the shock connecting arm is pivotably connected.

In an embodiment, the track kit comprises a support framework rigidly connectable to the chassis and to which the front idler wheel axle of each track assembly is rigidly connected and the at least one swing arm of each track assembly is pivotably connected.

In an embodiment of the track kit, the front shock absorber of each track assembly is pivotably connected to the support framework and/or the pinch wheel axle of each track assembly is rigidly connected to the support framework and/or the shock connecting arm of each track assembly is pivotably connected to the support framework.

In an embodiment of the track kit, the support framework comprises at least the first connecting element to which the front idler wheel axle is rigidly connected and the second connecting element to which the at least one swing arm is pivotably connected. The support framework may be a substantially horizontal framework.

In an embodiment of the track kit, the rear swing arm is pivotably connected to the second connecting element and the support framework comprises the third connecting element to which the front swing arm is pivotably connected. In other words, the at least one swing arm or swing arm assembly is connected to the second and the third connecting element.

In an embodiment of the track kit, the support framework comprises at least one of the fourth connecting element to which the front shock absorber is pivotably connected, the fifth connecting element to which the pinch wheel axle is rigidly connected and the sixth connecting element to which the shock connecting arm is pivotably connected.

In an embodiment of the track kit, the support framework comprises a seventh connecting element to which the upper end of a shock absorber may be connected.

In an embodiment of the track kit, the support framework is modular.

In an embodiment of the track kit, the support framework comprises at least a first section rigidly connectable to the chassis and at least a second section comprising the track assemblies, the second section being releasably connectable to the chassis via the first section. The second section may comprise the first and second connecting elements of the track assemblies. The second section may also comprise any of the third, fourth and fifth connecting elements of the track assemblies. In an embodiment of the track kit, the first section may constitute an integral part of the chassis or may be pre-installed on a commercial vehicle.

In an embodiment of the track kit, the first section comprises the sixth connecting elements and optionally the seventh connecting elements.

In an embodiment of the track kit, the second section comprises at least two second section halves, each half connected to a separate track assembly. In other words, the framework may comprise a second and third section, each of the second and third section connected to a separate track assembly. Each of the second section halves (or each of the second section and the third section) may comprise a first and second connecting element for one of the track assemblies, and optionally any of the third, fourth and fifth connecting element.

In an embodiment of the track kit, the first section may constitute an integral part of the chassis or may be pre-installed on a commercial vehicle.

In a second aspect, the present invention provides a track assembly for a track kit according to the first aspect and optionally any embodiments thereof.

In a third aspect, the present invention provides a vehicle comprising a track kit according to the first aspect, and optionally any embodiments thereof, or a track assembly according to the second aspect.

In a fourth aspect, the invention provides a method of converting a wheel-drive vehicle to a track-drive vehicle, the vehicle comprising a chassis, a rear drive axle featuring two opposite wheel hub units and a rear suspension, the method comprising the steps of:
- providing a track kit according to any embodiment of the first aspect;
- connecting the drive wheel of each track assembly to a corresponding wheel hub unit;
- rigidly connecting the front idler wheel axles to the chassis;
- pivotably connecting the at least one swing arms to the chassis; and
- operably connecting the lower end of a shock absorber to the shock absorber connecting assembly.

In an embodiment of the fourth aspect, the rear suspension comprises at least one shock absorber, and the method comprises a step of disconnecting at least the lower end of the shock absorber from the rear suspension prior to connecting the lower end to at least one of the shock absorber connecting assemblies.

In an embodiment, the fourth aspect comprises a step of:
operably connecting the front shock absorber to the chassis.

In an embodiment, the fourth aspect comprises a step of:
- disconnecting an upper end of the at least one shock absorber from the rear suspension;
- connecting the second connection of the rear suspension locking device to a vertically moveable portion of the rear suspension; and
- connecting the third connection of the rear suspension locking device to the chassis.

In an embodiment, the fourth aspect comprises a step of:
connecting the first connection of the rear suspension locking device to the upper end of the at least one shock absorber.

In an embodiment, the fourth aspect comprises the steps of:
- disconnecting an upper end of the at least one shock absorber from the rear suspension; and
- connecting the upper end of the at least one shock absorber to a connecting point having a fixed level relative to the chassis.

In a fifth aspect, the present disclosure provides a ski assembly for mounting on a front wheel hub unit of a wheel-drive vehicle, wherein the wheel hub unit comprises a wheel and a brake caliper bracket fastened to a bracket mount on the hub unit by caliper mounting bolts, the ski assembly comprises a ski element and a fastening assembly, wherein
the fastening assembly comprises an arm having a first end and a second end, the first end is pivotably connected to the ski element around a pivot axis being transverse to the longitudinal direction of the ski element and the second end comprises a ski fastening bracket comprising at least two mounting bolt holes arrangeable at positions corresponding to the positions of the caliper mounting bolts, such that the second end may be rigidly connected to the bracket mount.

In an embodiment of the fifth aspect, the ski assembly comprises at least two ski assembly mounting bolts, each bolt dimensioned to replace a caliper mounting bolt and having a length such that the ski fastening bracket may be rigidly connected to the bracket mount.

In an embodiment of the fifth aspect, the ski element comprises a cut out through which a lower section of the wheel may extend. The cut out is preferably dimensioned such that the wheel is not in contact with the ski element.

In an embodiment of the fifth aspect, the ski element comprises at least a first support rib arranged in the longitudinal direction of the ski element. The ski element may comprise a first support rib and a second support rib arranged in the longitudinal direction of the ski element, wherein the support ribs are arranged on opposite sides of the cut out.

In an embodiment of the fifth aspect, the first end is pivotably connected to the ski element at the first support rib.

The terms «rigidly connected to" and "rigidly connectable to" are intended to mean that two features/elements are connected/connectable such that they are in a rigid/fixed relationship, i.e. not able to move relative to one another. It is to be understood that the two features may be rigidly connected/connectable via any suitable intermediate feature or element. The terms "rigidly connected to" and "rigidly connectable to" may alternatively be replaced by "rigidly connected relative to" and "rigidly connectable relative to", respectively.

The term "pivotably connected" and "pivotably connectable" are intended to mean that two features/elements are connected/connectable such that they may pivot relative to each other. By use of the term it is considered implicit that the two features are connected/connectable by a suitable pivot connection. It is to be understood that the two features may be pivotably connected/connectable via any suitable intermediate feature or element that may be rigidly connected to any of the two features. The terms "pivotably connected to" and "pivotably connectable to" may alternatively be replaced by "pivotably connected relative to" and "pivotably connectable relative to", respectively.

The term "operably connected" and "operably connectable" are intended to define a connection between two features which ensures that they work together. Alternatively, the term defines a connection between two features which provides a certain effect/result. In other words, the two features do not have to be in direct contact but may also be indirectly connected via intermediate elements/features.

The term "support framework" is intended to mean a support structure which may comprise various constructional elements, such as beams, profiles and plates.

The term "chassis" is intended to mean the framework, or support structure, of the vehicle to which the rear suspension, engine etc. is mounted.

BRIEF DESCRIPTION OF THE DRAWINGS

The present invention is described in detail by reference to the following drawings.

DETAILED DESCRIPTION OF THE INVENTION

Figure 1:
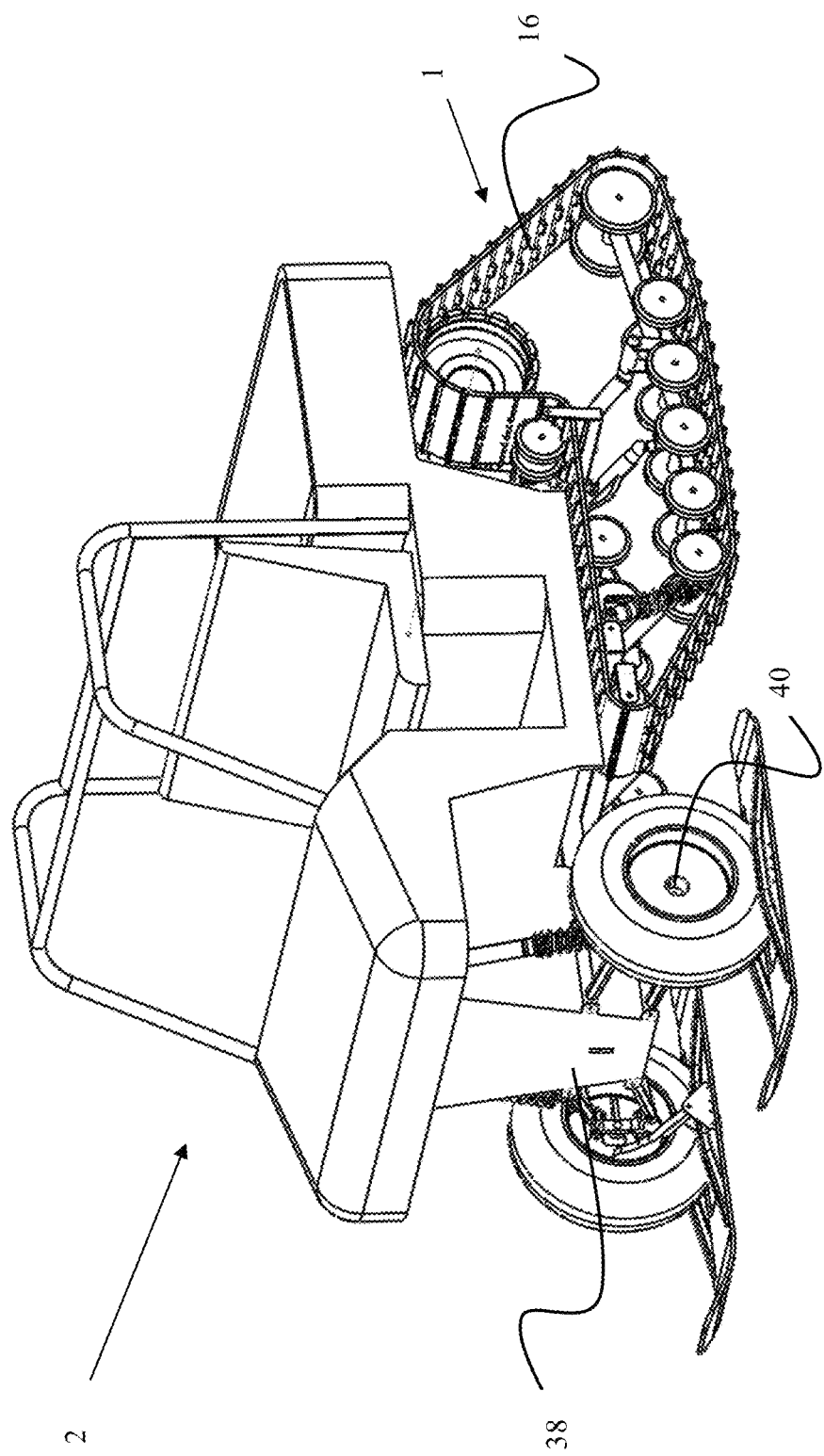
FIG. 1 is a perspective side view of a vehicle featuring an exemplary track kit according to the present invention.
Figure 2:
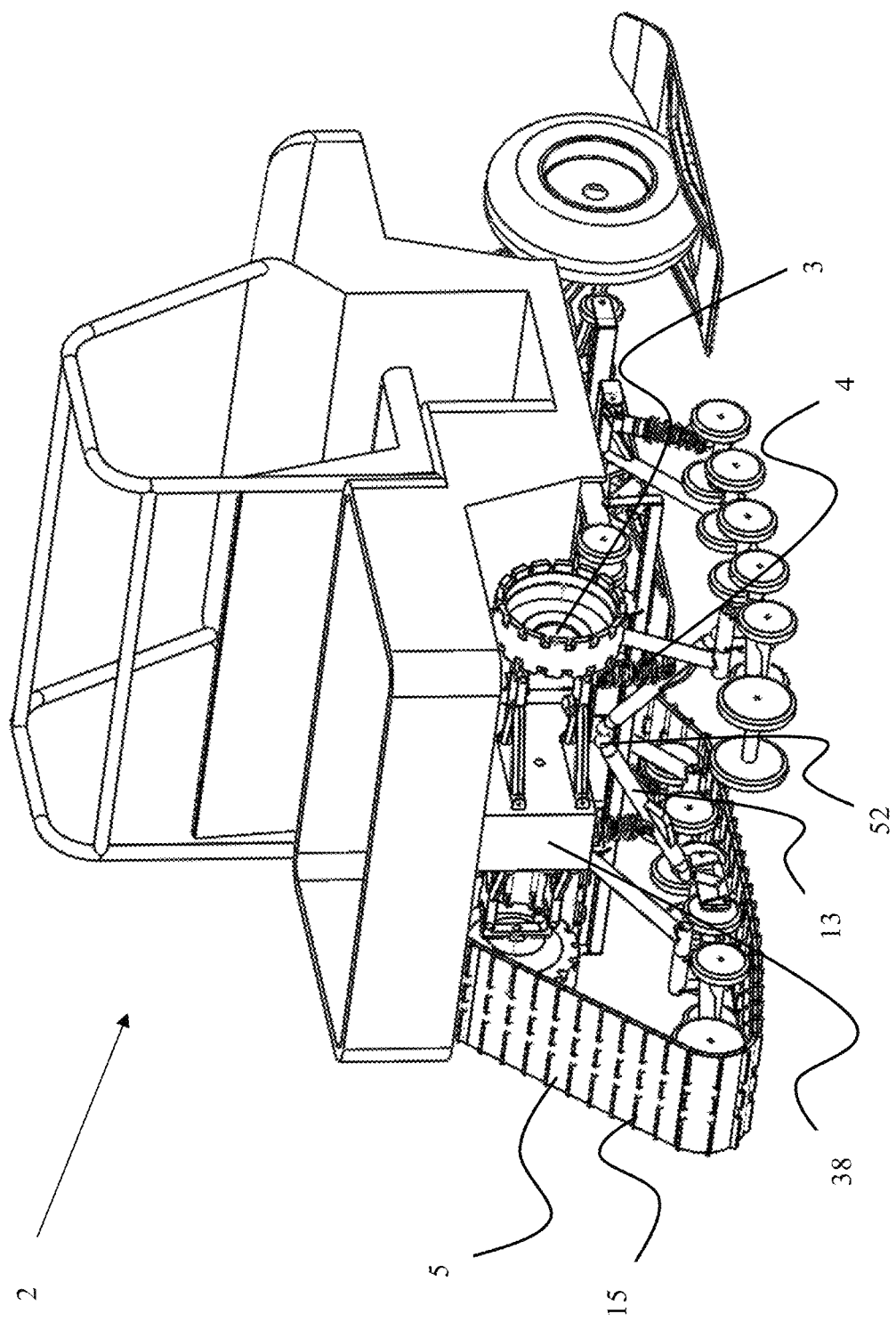
FIG. 2 is a perspective rear view the vehicle in FIG. 1.
Figure 3:
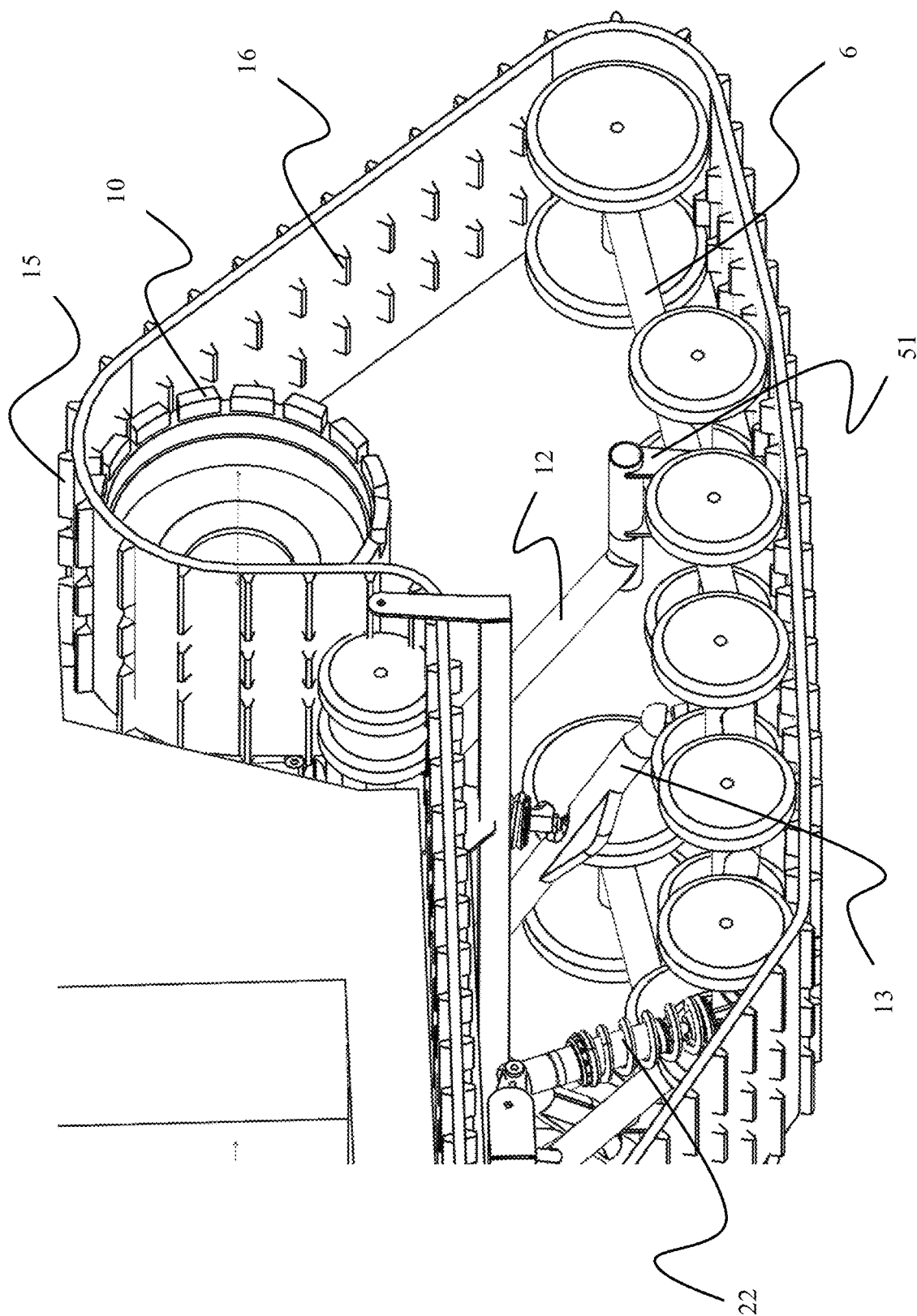
FIG. 3 is an enlarged perspective view of the track kit of the vehicle in FIG. 1.
Figure 4:
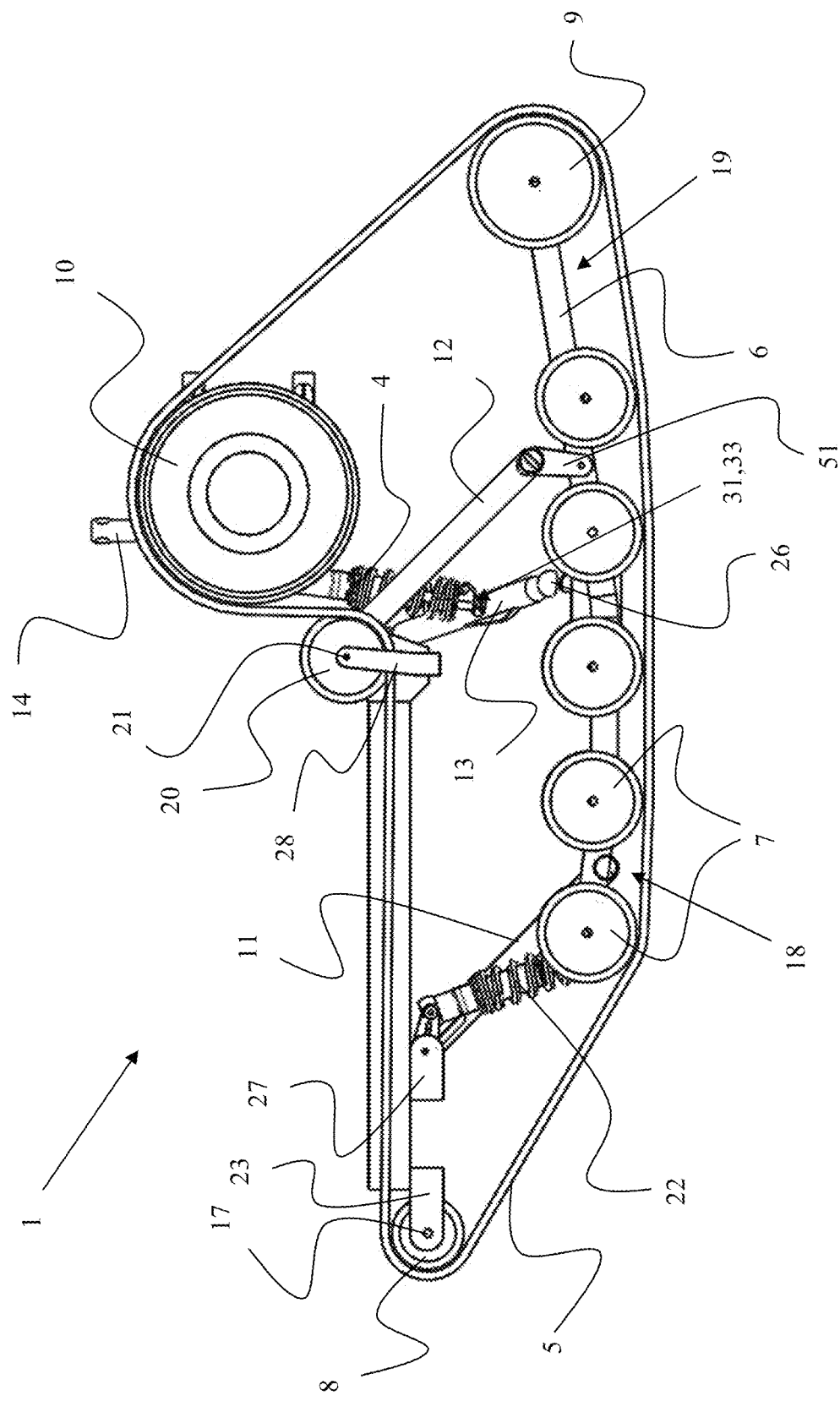
FIG. 4 is a side view of the track kit mounted to the vehicle in FIG. 1.
Figure 5:
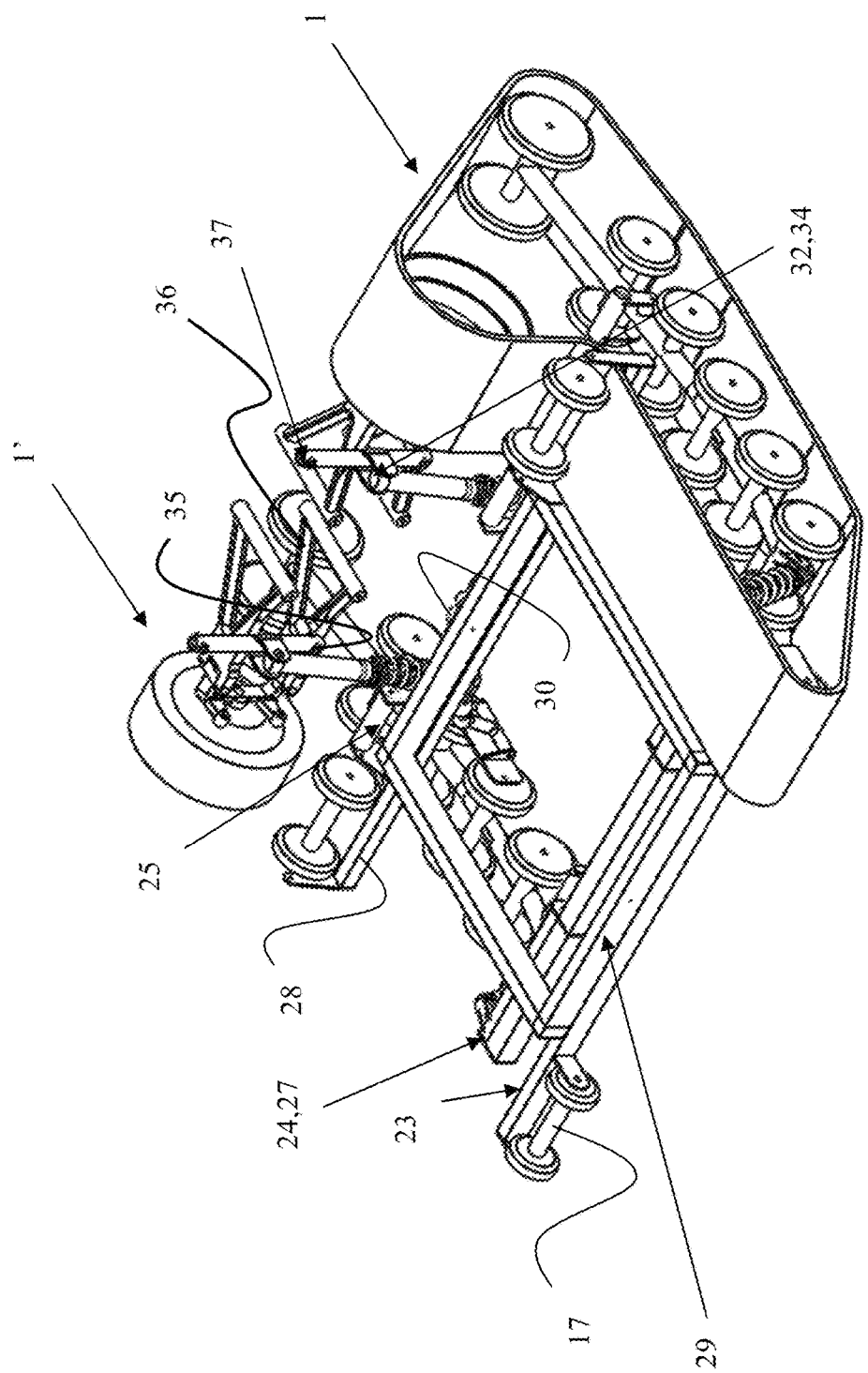
FIG. 5 is a perspective top view of the track kit in FIG. 4.

A vehicle 2 comprising a first exemplary track kit is shown in FIGS. 1-3. Further details of the exemplary track kit are shown in FIGS. 4 and 5.

In the first exemplary embodiment, the inventive track kit is described by use of a vehicle 2 featuring a chassis 38, a rear drive axle featuring two opposite wheel hub units 3, and a double A-arm rear suspension having a rear shock absorber 4 for each of the wheel hub units. However, the exemplary track kit may easily be adapted for vehicles featuring other types of rear suspensions. In the description below, the track kit is mounted by use of the original rear shock absorbers of the vehicle. However, in some instances it may be preferred to replace the original rear shock absorbers by unoriginal shock absorbers having improved properties for use together with the track kit.

Figure 6:
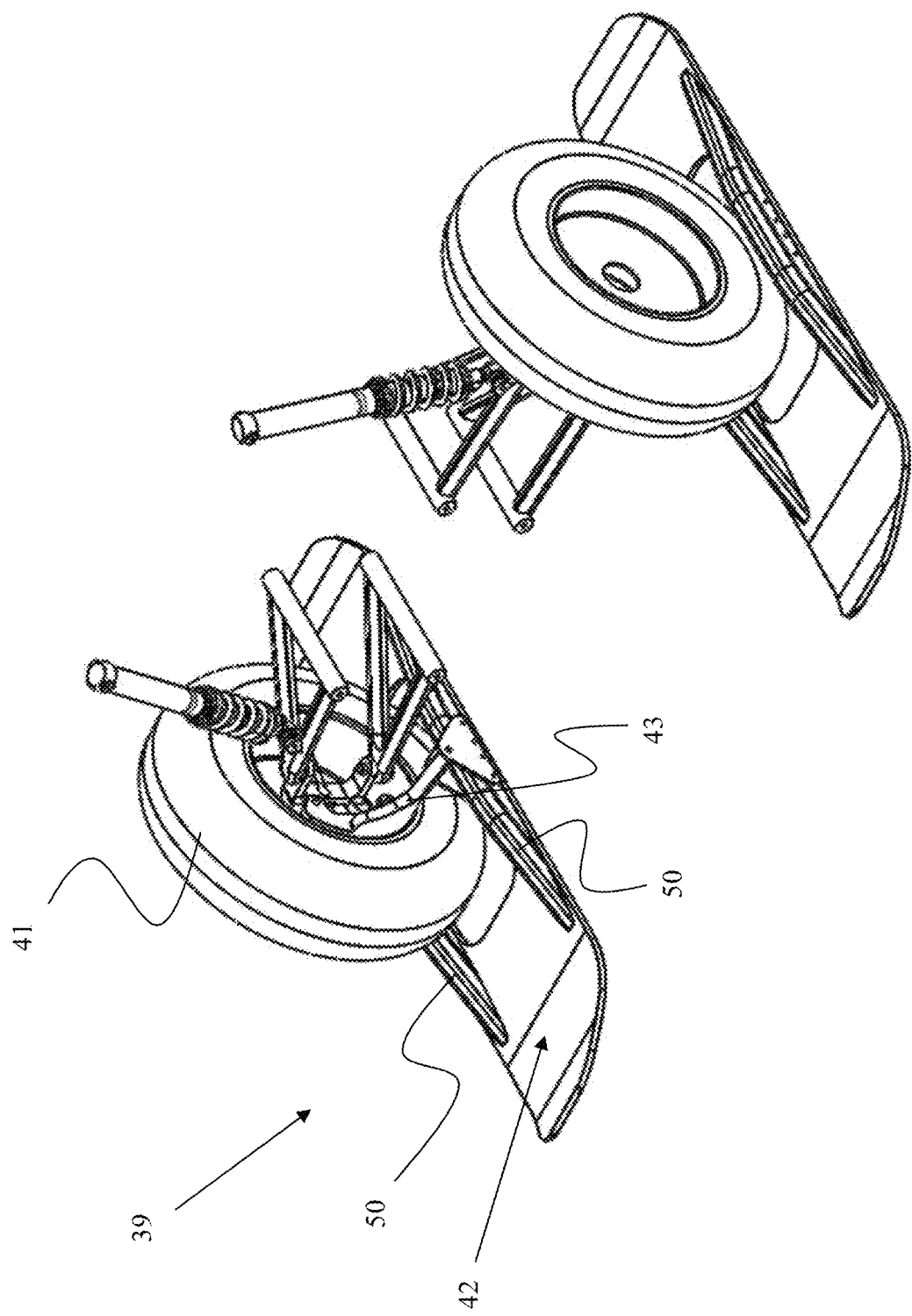
FIG. 6 is a perspective view of the ski assembly arranged on the front wheels of the vehicle in FIG. 1.
Figure 7:
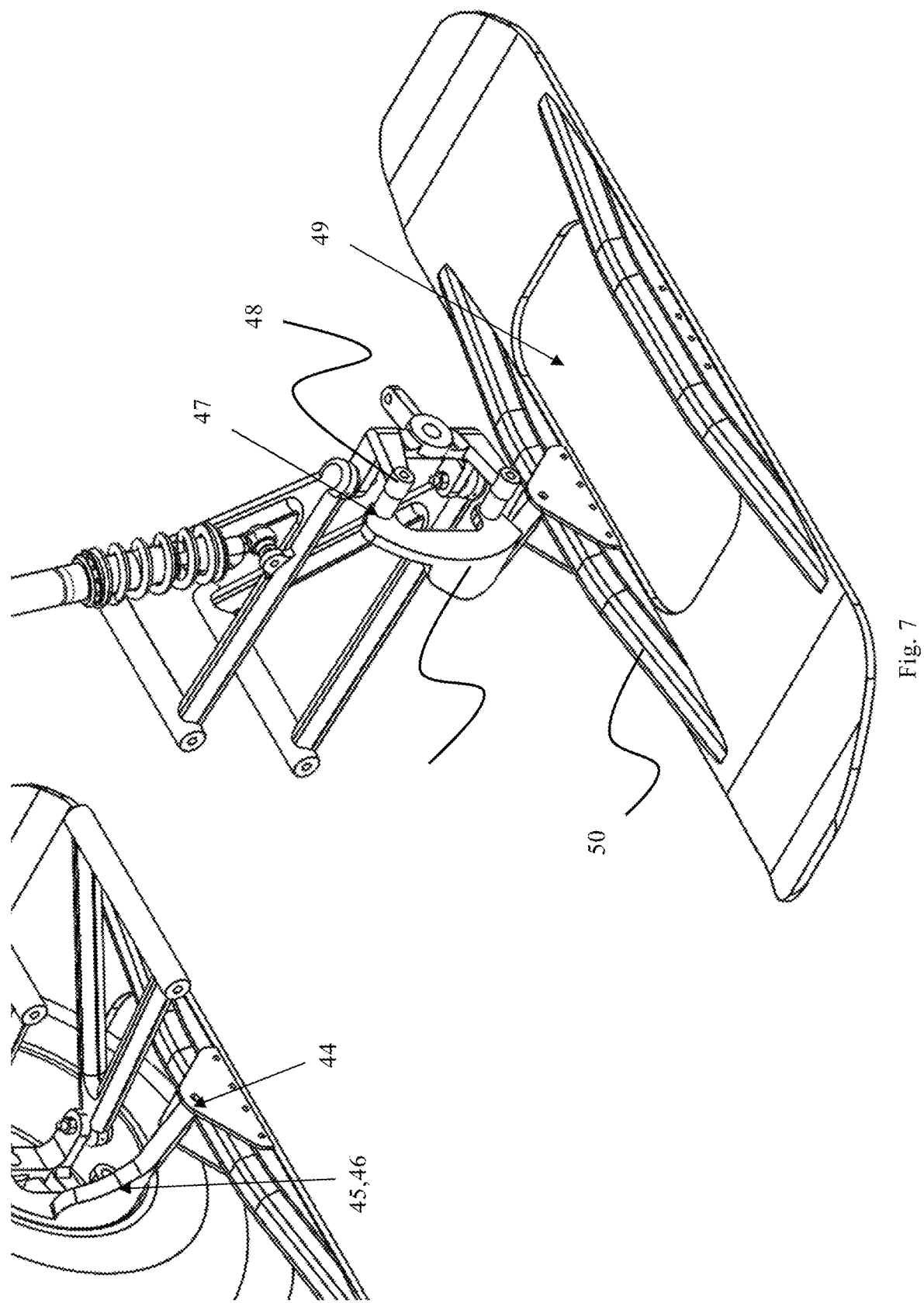
FIG. 7 is an enlarged view of the ski assembly in FIG. 6.
Figure 8:
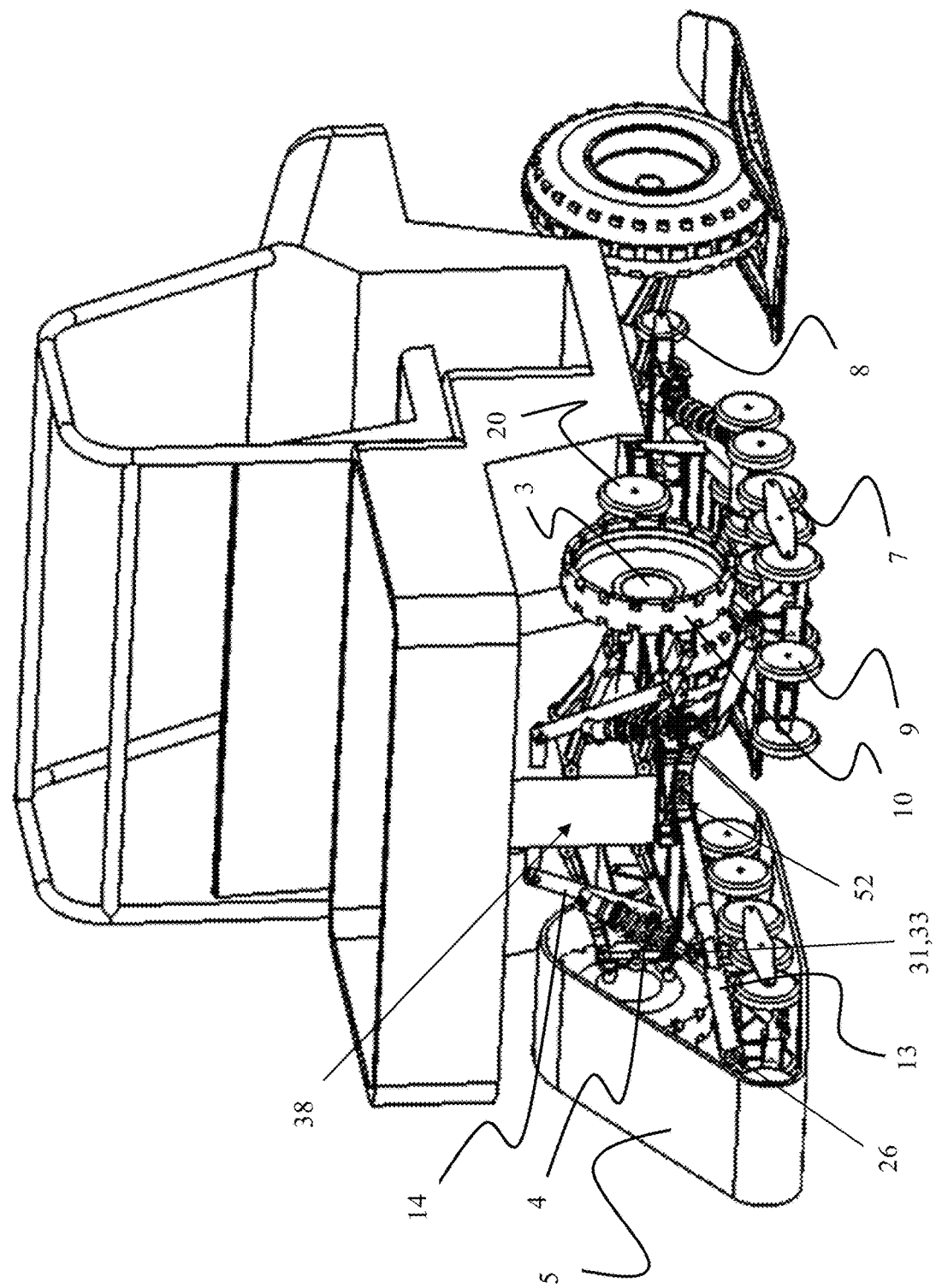
FIG. 8 is a perspective rear view of a vehicle featuring a second exemplary track kit according to the present invention.
Figure 9:
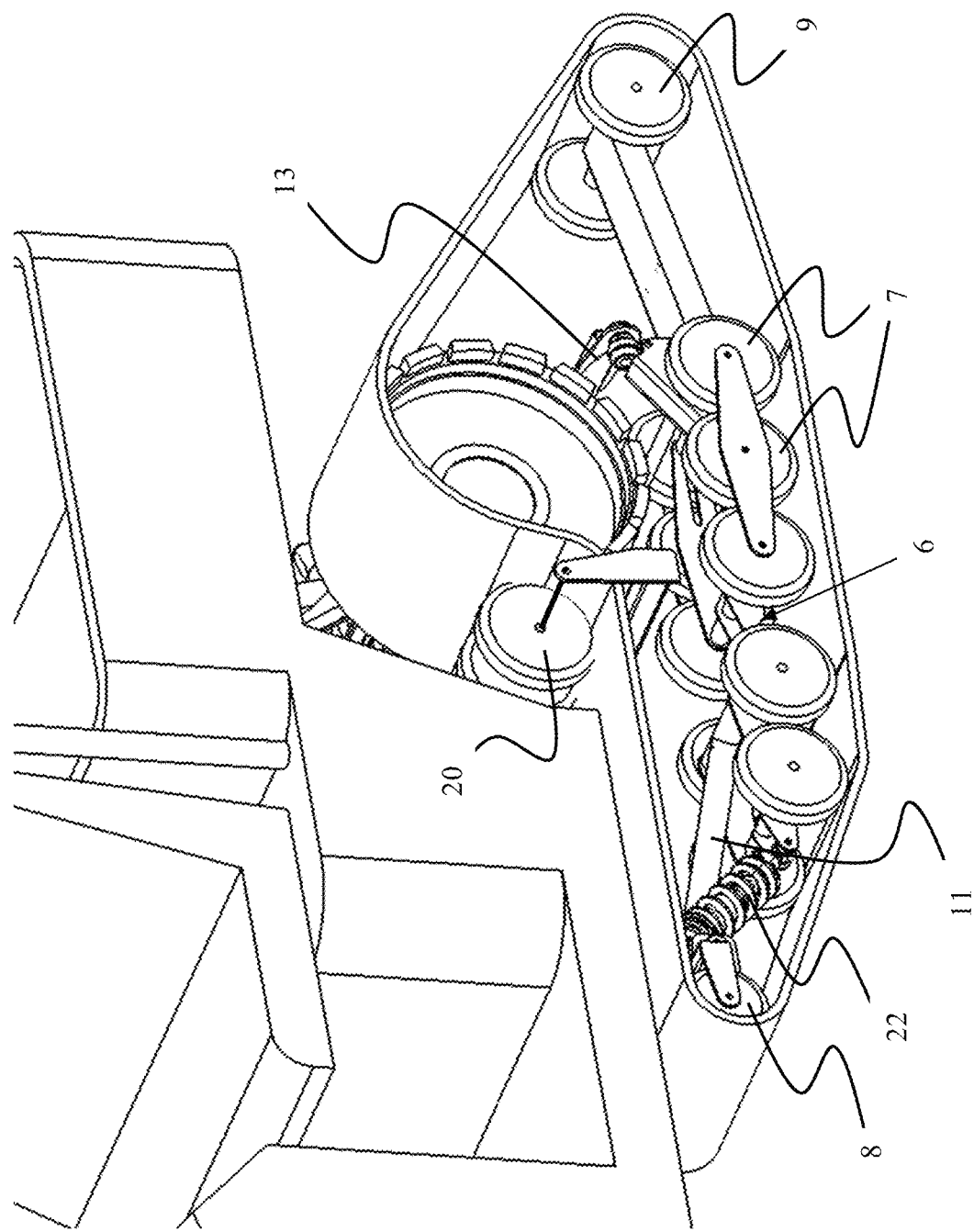
FIG. 9 is an enlarged perspective view of the track kit in FIG. 8.
Figure 10:
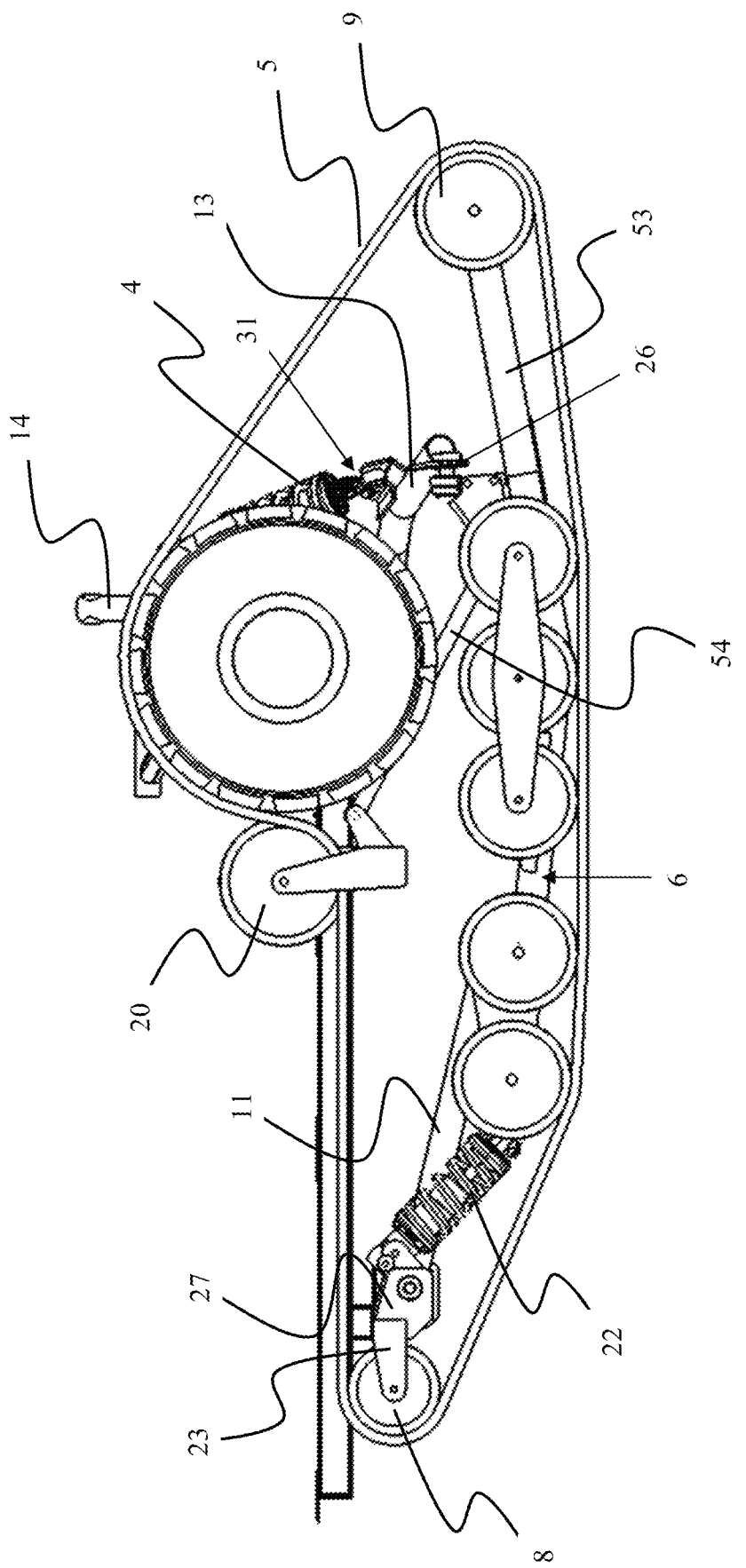
FIG. 10 is a side view of the track kit shown in FIG. 8.
Figure 11:
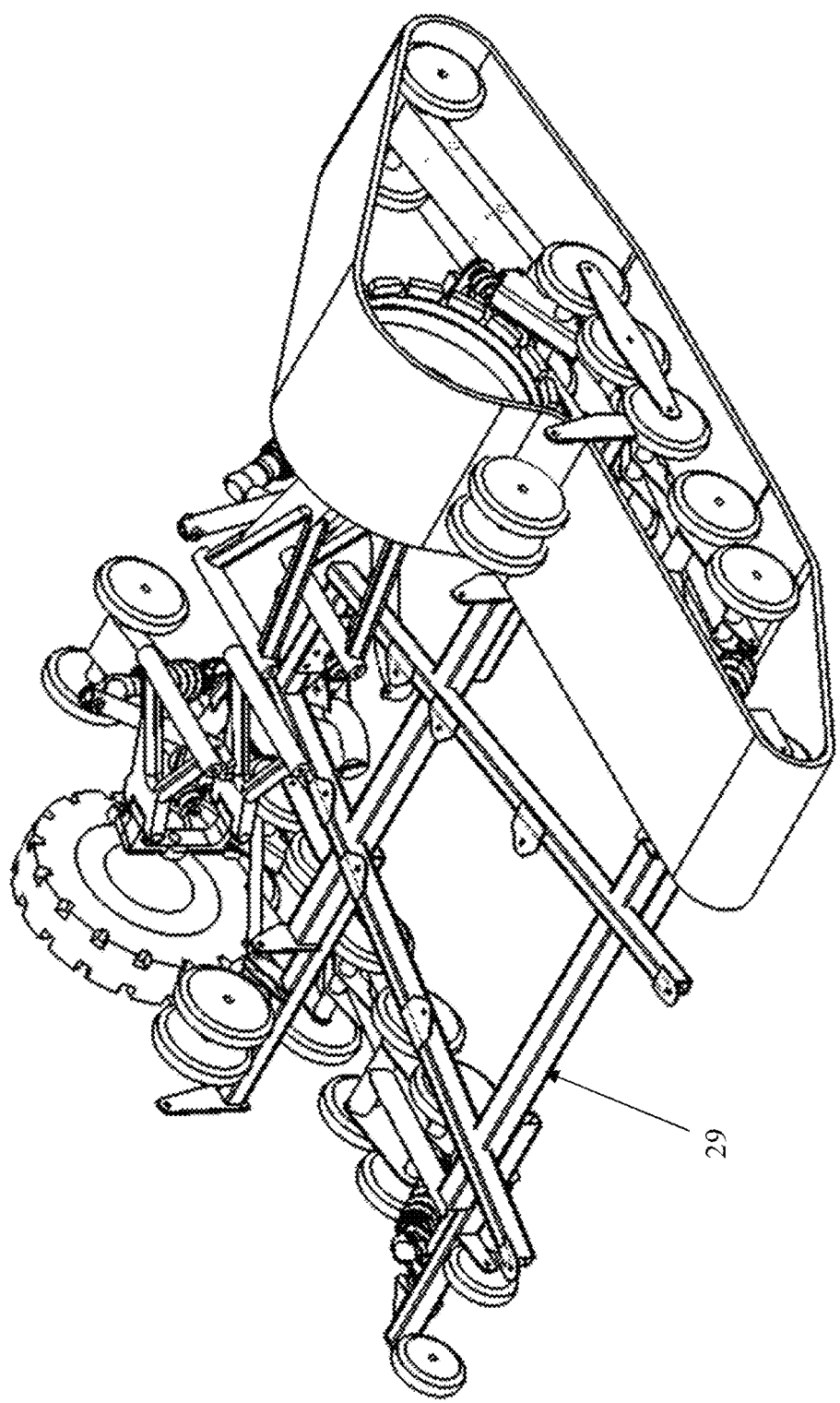
FIG. 11 is a perspective top view of the track kit in FIG. 8.
Figure 12:
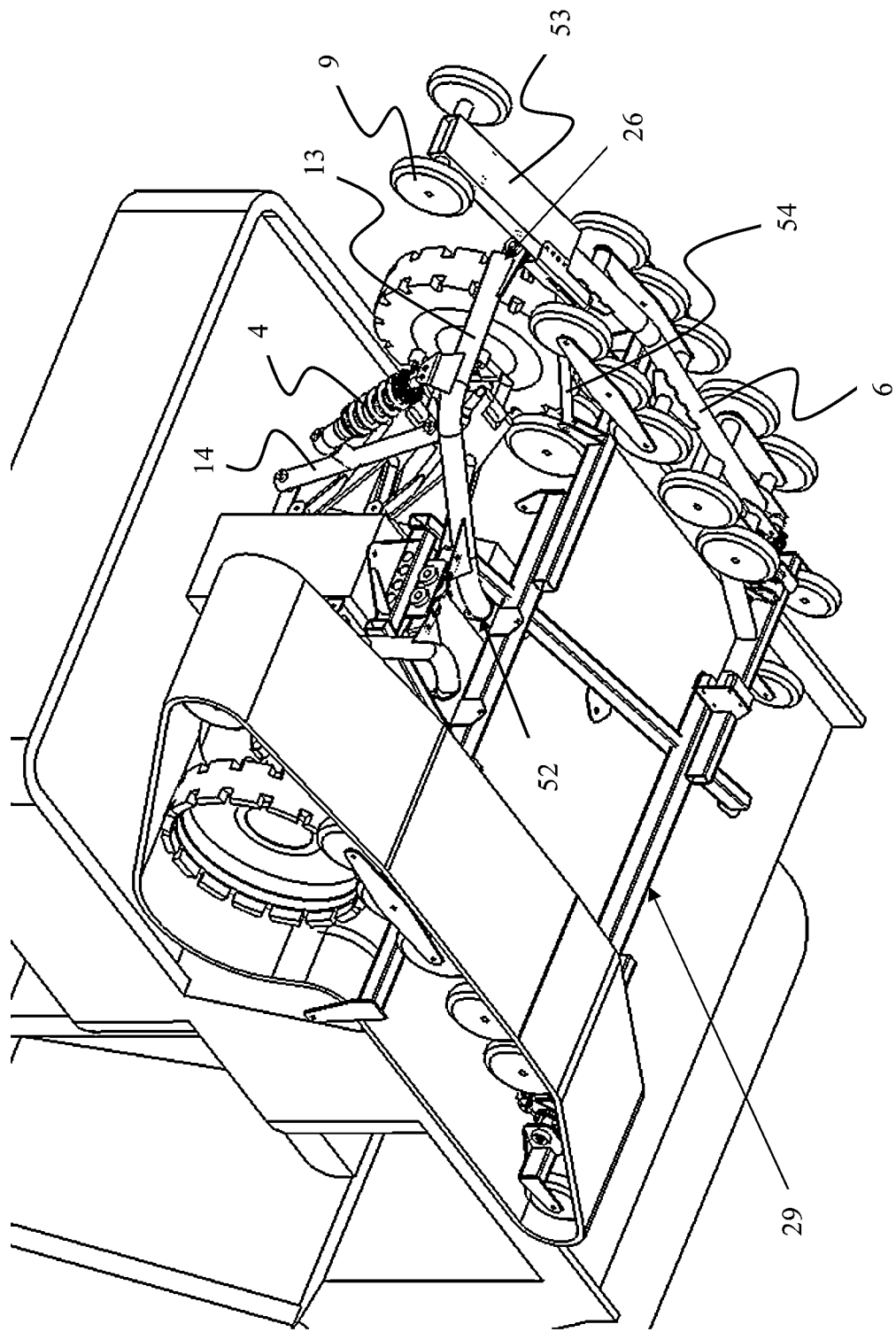
FIG. 12 is a perspective view from below of the track kit in FIG. 8.

The vehicle 2 is further provided with a ski assembly 39 mounted on each of the front wheel hub units 40. Details of the ski assemblies are described below by reference to FIGS. 6 and 7.

The exemplary track kit features two track assemblies 1, 1' interconnected by a support framework 29. Each track assembly comprises an endless ground track 5, a front idler wheel 8, a center beam 6 (i.e. intermediate support member) comprising multiple intermediate idler wheels 7 (i.e. at least one track engaging element), a rear idler wheel 9, a drive wheel 10, a pinch wheel 20, a front swing arm 11 and a rear swing arm 12 (i.e. at least one swing arm) and a shock absorber connecting assembly 13, 14.

The endless track 5 comprises an external side featuring ground lugs 15 for ground engagement and an internal side featuring drive lugs 16 for engagement with the drive wheel 10, see FIGS. 2 and 3. The internal side of the ground track 5 is circumferentially trained around and in contact with the front idler wheel 8, the multiple intermediate idler wheels 7, the rear idler wheel 9 and the drive wheel 10.

The drive wheel 10 of each track assembly 1, 1' is connectable/connected to one of the wheel hub units 3 of the vehicle 2. Although not shown in the drawings, the drive wheels 10 are preferably mounted to the wheel hub units via wheel hub bolts.

The front idler wheel 8 is arranged at a level above the multiple intermediate idler wheels 7 and comprises a front idler wheel axle 17 rigidly connectable/connected to the chassis 38.

The pinch wheel 20 is in contact with the external side of the endless track 5 and is arranged adjacent to the drive wheel 10 and rear of the front idler wheel 8. The pinch wheel 20 and the front idler wheel 8 is arranged such that an upper forward section of the ground track 5, i.e. the section of the ground track 5 extending between the pinch wheel 20 and the front idler wheel 8, is guided at a level below the chassis 38. The pinch wheel 20 comprises a pinch wheel axle 21 rigidly connectable/connected to the chassis 38. The requirement of having a pinch wheel 20 is in part decided by the construction/shape of the chassis. In alternative embodiments of the track kit, suitable for a vehicle chassis different from the chassis in the disclosed exemplary embodiment, a pinch wheel 20 may not be required in order to guide the track 5 below the chassis.

In the exemplary track kit, each of the front idler wheel 8, the multiple intermediate idler wheels 7, the rear idler wheel 9 and the pinch wheel 20 features two parallel wheels having a common rotational axis. In other embodiments, the intermediate idler wheels may for instance be connected to the center beam 6 via rocker arms.

The front swing arm 11 is pivotably connected to a front section 18 of the center beam 6 and pivotably connectable/connected to the chassis 38. The rear swing arm 12 is pivotably connected to a rear section 19 of the center beam 6 via a pivot link arm 51 and pivotably connectable/connected to the chassis 38. The pivot link arm 51 is pivotably connected to the rear section of the center beam 6 and a lower end of the rear swing arm 12. The pivot link arm 51 allows the center beam 6 to tilt/pivot in a vertical plane even when connected to both the front swing arm 11 and the rear swing arm 12, such that the center beam 6 may follow the terrain during use. The purpose of the front swing arm 11 is to guide the movement of the center beam 6 such that the tension of the ground track 5 is maintained during vertical movement of the center beam, i.e. the vertical damping movements caused by ground interaction during use, as well as prevent sideways and torsional movement of the center beam 6 relative the chassis 38.

The purpose of the rear swing arm is, in combination with the front swing arm, to prevent sideways and torsional movement of the center beam 6 relative the chassis 38. In other embodiments of the track kit, the rear swing arm 12 may be removed or dispensed with provided the front swing arm is sufficiently dimensioned to prevent sideways and torsional movement of the center beam 6. In further embodiments, see FIGS. 8-12, the function of the rear swing arm may be performed by a shock connecting arm 13.

The shock absorber connecting assembly 13, 14 features a shock connecting arm 13 having a first end 26 pivotably connected to the center beam 6 and a second end 52 pivotably connectable to the chassis 38. The shock connecting arm 13 is operably connectable/connected to a lower end 31 of a rear shock absorber of the vehicle 2 via a connection 33 arranged between the first end 26 and the second end 52. In the exemplary embodiment, the vehicle features two rear shock absorbers 4. It is noted that the shock absorber connecting assembly 13, 14 may easily be adapted/modified for vehicles featuring a single rear shock absorber 4 mounted to a single rear suspension swing arm, such as some types of ATVs.

In such cases, the shock connecting arms 13 of the two track kit assemblies may for instance be interconnected by an intermediate shock connecting beam to which a lower end of a single rear shock absorber may be connected. Alternatively, the single rear shock absorber may be replaced by a rigid element, e.g. a rod, and the intermediate connecting beam connected to the chassis by two unoriginal shock absorbers.

In other embodiments of the track kit, the shock absorber connecting assembly may comprise any suitable shock connecting arm providing an operable connection between the center beam and a lower end of a rear shock absorber. Various solutions for obtaining an operable connection between a lower end of a rear shock absorber and the center beam will be apparent for the skilled person having knowledge of the present disclosure.

The level of the wheel hub units 3 are fixed relative the chassis by a locking beam 14 (i.e. a rear suspension locking device) arranged to prevent vertical movement of the wheel hub units. In the exemplary embodiment, the locking beam is arranged to lift the level of the wheel hub units relative to the chassis, i.e. the fixed level of the wheel hubs is above the original level of the wheel hubs before attachment of the locking beam. The preferred fixed level will depend on the type of vehicle on which the track kit is mounted and/or the required amount of dampening or suspension travel of the center beam 6. The locking beam 14 is a part of the shock absorber connecting assembly 13, 14 and has a first connection 34 connected/connectable to an upper end 32 of the corresponding rear shock absorber 4, a second connection 35 connected/connectable to a lower A-arm 36 of the rear suspension of the vehicle (i.e. a vertically moveable portion of the rear suspension; may in other vehicles be an upper A-arm, a trailing arm, a vertically moveable link in a multi-link suspension etc.) and a third connection 37 connecting (or for connecting) the locking beam to the chassis 38. In the exemplary embodiment, the locking beam is connected to the chassis via an original connection for an upper end of the rear shock absorber 4.

Although advantageous in that the track kit is more easily adapted to various vehicles and lengths of suspension travel and that it provides some reduction of the unsprung weight, it is not a requirement to fix the level of the wheel hub units 3 to obtain a track kit providing a significantly reduced unsprung weight. In alternative embodiments of the track kit, the vertical movement of the wheel hub units is not necessarily locked by a locking beam provided the upper end of the shock absorber is connected to the original shock mounts or to another connecting point having a fixed level relative to the chassis.

The technical effect of having the front idler wheel axel 17 rigidly connected to the chassis 38, and at least the front swing arm 11 pivotably connected to the chassis 38 and the center beam 6, is that the movement of the center beam (i.e. a lower part of the track kit) is independent of the upper part of the track kit and the chassis. In this manner, the unsprung weight of the track kit (and the converted vehicle) is reduced considerably. Further, an increased track length is possible without causing excessive torsional forces on the wheel hub units. Further reduction of the unsprung weight is obtained by any one of the features of having the pinch wheel 20 rigidly connected to the chassis and having the vertical movement of the wheel hub units 3 fixed/locked relative to the chassis. Compared to a theoretical track kit having track assemblies only connected to the vehicle via the wheel hub units, as in prior art track kits, the unsprung weight of the exemplary track kit is reduced by about 50-70%. The reduced unsprung weight provides improved suspension characteristics, driving comfort, durability and practical vehicle speed.

In the exemplary track kit, each track assembly 1, 1' also features a front shock absorber 22 pivotably connected to a front section 18 of the center beam and pivotably connected/connectable to the chassis. The front shock absorber 22 ensures that more of the vehicle weight is supported by the track kit. In practice, the front shock absorber shortens the wheelbase of the vehicle and reduces the weight supported by the front steering elements, i.e. the front wheels/ski assemblies of the exemplary embodiment. By reducing the supported weight, the maneuverability of the vehicle on soft ground, such as deep snow, sand, bog etc., is improved. When the weight supported by the front steering elements is high, they tend to dig into the soft ground. The effect of reducing the weight supported by the front steering element is also advantageous when the inventive rear track kit is used together with prior art front track kits, since the prior art front track kits are heavy and easily dig into soft ground.

The effect of reducing the weight supported by the front steering element obtained by use of the front shock absorber 22 may also be obtained by moving the contact point between the first end 26 of the shock connecting arm 13 and the center beam 6 forwards, i.e. closer to the front of the track assembly. This solution may not be optimal for all vehicles since the front shock absorber provides a better driving comfort, but it will provide a more simple and affordable track kit.

The exemplary track kit features a support framework 29 rigidly connected/connectable to the chassis. The support framework features the following connecting elements for each of the track assemblies 1, 1'; a first connecting element 23 to which the front idler wheel axle is rigidly connected, a second connecting element 24 to which the rear swing arm 12 is pivotably connected, a third connecting element 25 to which the front swing arm 11 is pivotably connected, a fourth connecting element 27 to which the front shock absorber 22 is pivotably connected, a fifth connecting element 28 to which the pinch wheel axle 21 is rigidly connected and a sixth connecting element 30 to which the shock connecting arm 13 is pivotably connected. The support framework 29 is highly advantageous since it allows for a simple and time-efficient mounting/connection of the track kit to a vehicle.

The support framework 29 may advantageously be modular. A modular framework may for instance be comprised by a first framework section rigidly connectable to the chassis and a second framework section comprising the track assemblies 1.1', the second framework section may be releasably connectable to the chassis 38 via the first framework section. The second framework section may for instance comprise the first and second connecting elements 23, 24 of the track assemblies 1, 1' and optionally any of the third, fourth, fifth and sixth connecting elements 25, 26, 27, 28 of the track assemblies. The first framework section may optionally constitute an integral part of the chassis 38 or may be pre-installed on a commercial vehicle.

Other alternative solutions for a modular framework 29 will be obvious to the skilled person based on the present disclosure. Such alternative solutions may for instance include having the second framework section further divided into at least two second section halves, wherein each half is connected to a separate track assembly. Each of the second section halves may comprise a first and second connecting element for one of the track assemblies, and optionally any of the third, fourth and fifth connecting element. In yet further solutions, a vehicle may have any of the first to sixth connecting elements pre-installed on the chassis or as an integral part of the chassis.

Although the disclosed support framework is predominantly constructed of beam elements, parts or sections of the support framework may advantageously be constructed of other elements, such as reinforced/profiled plates and similar. The first framework section may for instance be a reinforced or profiled plate element being connectable to a vehicles chassis and connectable to the second framework section(s).

In snow conditions, the front wheels of wheel-drive vehicles may advantageously be converted by a ski kit. An exemplary ski kit comprising a ski assembly 39 for each of the front wheels of a vehicle is shown in FIGS. 1, 2, 6 and 7. Each ski assembly 39 is mounted on a front wheel hub unit 40 of a front wheel-drive vehicle 2, wherein the wheel hub unit 40 comprises a wheel 41 and a brake caliper bracket fastened to a bracket mount on the hub unit by caliper mounting bolts. The ski assembly comprises a ski element 42 and a fastening arm 43 (i.e. a fastening assembly). The fastening arm 43 has a first end 44 and a second end 45, wherein the first end is pivotally connected to the ski element 42 around a pivot axis being transverse to the longitudinal direction of the ski element 42. The second end 45 features a ski fastening bracket 46 comprising two mounting bolt holes 47. The mounting bolt holes are arrangeable at positions corresponding to the positions of the caliper mounting bolts, such that the second end may be rigidly connected to the bracket mount by suitable mounting bolts 48. Each mounting bolt 48 is dimensioned to replace a caliper mounting bolt and has a length such that the ski fastening bracket 46 may be rigidly connected to the bracket mount. In this manner, the ski assembly may be easily mounted securely to the front wheel hub. Further, by being mounted to the front wheel hub the ski assembly obtains a very precise steering.

To allow use of the ski assembly on a vehicle with a front wheel drive, or all-wheel/four-wheel drive, without decoupling the front wheel drive, the ski element features a cut out 49 through which a lower section of the wheel 41 may extend. A further advantage of the cut out is that the vehicle may drive at least some distances on hard surfaces like asphalt without damaging the ski elements 42. In addition, the front wheels will also contribute to an increased traction or propulsion when used on soft ground. In the exemplary embodiment, the cut out is in the form of a hole in the ski element. However, in other embodiments, the cut out may be in the form of a recess. The recess arranged in the side of the ski element opposite the side at which the first end 44 of the fastening arm is connected. When the cut out is a recess, the ski assembly may be connected to the front wheel hub unit 40 without having to move or jack up the front wheel.

In the exemplary ski assembly, the ski element 42 features two support ribs 50 in the longitudinal direction of the ski element and arranged on opposite sides of the cut out 49. The support ribs provide increased stiffness and strength to the ski element. The first end is pivotally connected to the ski element 42 at one of the support ribs 50. Alternative solutions for obtaining a ski element having the required stiffness and strength are easily conceivable based on the present disclosure.

A second exemplary embodiment of a track kit according to the invention is shown in FIGS. 8-12. The second embodiment has most of its technical features in common with the track kit shown in FIGS. 1-5 and such features are denoted by the same references numbers. The function of the common technical features is as described above for the first embodiment.

The main difference between the track kit in FIGS. 8-12 and the track kit in FIGS. 1-5, is the design of the shock absorber connecting assembly. Like the first exemplary track kit, the shock absorber connecting assembly of the second exemplary track kit features a shock connecting arm 13 having a first end 26 pivotally connected to the center beam 6 and a second end 52 pivotally connectable to the chassis 38. The shock connecting arm 13 is operably connectable/connected to a lower end 31 of a rear shock absorber 4 of the vehicle 2 via a connection 33 arranged between the first end 26 and the second end 52. However, in the second exemplary track kit, the shock connecting arm 13 is connected to the center beam 6 further to the rear of the track kit, i.e. connected closer to the rear idler wheel 9. Further, the design of the shock connecting arm 13 allows it to perform the same function as the rear swing arm of the first exemplary track kit.

Due to the acute angle defined by the front swing arm 11 relative a ground below the second exemplary track kit, the rearwards movement of the center beam 6 during compression of the rear shock absorber 4 is not sufficient to uphold the tensioning of the endless belt 5. To obtain sufficient tensioning, the center beam 6 features a rear section 53 to which the rear idler wheel 9 is connected. The rear section 53 is slidably connected to a main part of the center beam 6 and connected to a track tensioning rod 54. During compression of the rear shock absorber 4, the track tensioning rod 54 will push the rear section 53 and the rear idler wheel 9 further rearwards, such that the endless track 5 is kept tensioned.

The invention claimed is:

1. A track kit for a vehicle, the vehicle comprising a chassis, a rear drive axle featuring two opposite wheel hub units and a rear suspension, and the track kit comprises two track assemblies, each track assembly comprises an endless track, a front idler wheel, an intermediate support member comprising at least one track engaging element, a rear idler wheel, a drive wheel, at least one swing arm and a shock absorber connecting assembly, wherein the endless track comprises an external side featuring ground lugs for ground engagement and an internal side featuring drive lugs for engagement with the drive wheel, and the internal side is circumferentially trained around and in contact with the front idler wheel, the at least one track engaging element, the rear idler wheel and the drive wheel;

the drive wheel is connectable to one of the wheel hub units;

the front idler wheel is arranged at a level above the at least one track engaging element and comprises a front idler wheel axle rigidly connectable to the chassis, such that the front idler wheel axle and the chassis are in a fixed relationship and not able to move relative to each other;

the at least one swing arm is pivotably connected to the intermediate support member and pivotably connectable to the chassis;

the shock absorber connecting assembly is connected to the intermediate support member and operably connectable to a lower end of a shock absorber having an upper end operably connected to the chassis.

2. The track kit according claim 1, wherein the shock absorber connecting assembly comprises a shock connecting arm having a first end pivotably connected to the intermediate support member and a second end pivotably connectable to the chassis, and the shock connecting arm is operably connectable to the lower end of the shock absorber via a connection arranged between the first end and the second end.

3. The track kit according to claim 1, wherein the at least one track engaging element comprises at least one intermediate idler wheel, a slide rail or any combination thereof.

4. The track kit according to claim 1, comprising a rear suspension locking device arrangeable to prevent vertical movement of the wheel hub units relative to the chassis during use.

5. The track kit according to claim 4, wherein the rear suspension locking device is a part of the shock absorber connecting assembly and comprises a first connection for the upper end of the shock absorber.

6. The track kit according to claim 4, wherein the rear suspension locking device comprises a second connection for a vertically moveable portion of the rear suspension and a third connection for connecting the rear suspension locking device to the chassis.

7. The track kit according to claim 1, wherein each track assembly comprises a front shock absorber operably connected to a front section of the intermediate support member and operably connectable to the chassis.

8. The track kit according to claim 1, wherein the at least one swing arm comprises a front swing arm and a rear swing arm, the front swing arm is pivotably connected to a front section of the intermediate support member and pivotably connectable to the chassis, and the rear swing arm is pivotably connected to a rear section of the intermediate support member and pivotably connectable to the chassis.

9. The track kit according to claim 1, comprising a support framework rigidly connectable to the chassis and to which the front idler wheel axle of each track assembly is rigidly connected and the at least one swing arm of each track assembly is pivotably connected.

10. The track kit according to claim 9, wherein the front shock absorber of each track assembly is operably connected to the support framework, and/or a pinch wheel axle of each track assembly is rigidly connected to the support framework, and/or a shock connecting arm of each track assembly is pivotably connected to the support framework.

11. The track kit according to any one of the claims 9-10, wherein the support framework is modular.

12. A vehicle comprising a track kit, vehicle comprising a chassis, a rear drive axle featuring two opposite wheel hub units and a rear suspension, and the track kit comprising two track assemblies, each track assembly comprises an endless track, a front idler wheel, an intermediate support member comprising at least one track engaging element, a rear idler wheel, a drive wheel, at least one swing arm and a shock absorber connecting assembly, wherein the endless track comprises an external side featuring ground lugs for ground engagement and an internal side featuring drive lugs for engagement with the drive wheel, and the internal side is circumferentially trained around and in contact with the front idler wheel, the at least one track engaging element, the rear idler wheel and the drive wheel; the drive wheel is connected to one of the wheel hub units; the front idler wheel is arranged at a level above the at least one track engaging element and comprises a front idler wheel axle rigidly connected to the chassis, such that the front idler wheel axle and the chassis are in a fixed relationship and not able to move relative to each other; the at least one swing arm is pivotably connected to the intermediate support member and pivotably connected to the chassis; the shock absorber connecting assembly is connected to the intermediate support member and operably connected to a lower end of a shock absorber having an upper end operably connected to the chassis.

13. A method of converting a wheel-drive vehicle to a belt-drive vehicle, the vehicle comprising a chassis, a rear drive axle featuring two opposite wheel hub units and a rear suspension, the method comprising the steps of:
providing a track kit comprising two track assemblies, each track assembly comprises an endless track, a front idler wheel, an intermediate support member comprising at least one track engaging element, a rear idler wheel, a drive wheel, at least one swing arm and a shock absorber connecting assembly, wherein the endless track comprises an external side featuring ground lugs for ground engagement and an internal side featuring drive lugs for engagement with the drive wheel, and the internal side is circumferentially trained around and in contact with the front idler wheel, the at least one track engaging element, the rear idler wheel and the drive wheel;
the drive wheel is connectable to one of the wheel hub units; the front idler wheel is arranged at a level above the at least one track engaging element and comprises a front idler wheel axle rigidly connectable to the chassis; the at least one swing arm is pivotably connected to the intermediate support member and pivotably connectable to the chassis; the shock absorber connecting assembly is connected to the intermediate support member and operably connectable to a lower end of a shock absorber having an upper end operably connected to the chassis;
connecting the drive wheel of each track assembly to a corresponding wheel hub unit;
rigidly connecting the front idler wheel axles to the chassis, such that the front idler wheel axle and the chassis are in a fixed relationship and not able to move relative to each other;
pivotably connecting the at least one swing arms to the chassis; and
operably connecting the lower end of the shock absorber to the shock absorber connecting assemblies.

* * * * *